United States Patent
Irwin

(10) Patent No.: US 8,926,310 B2
(45) Date of Patent: Jan. 6, 2015

(54) CUP THERMOFORMING MACHINE

(76) Inventor: Jere F. Irwin, Yakima, WA (US)

( * ) Notice: Subject to any disclaimer, the term of this patent is extended or adjusted under 35 U.S.C. 154(b) by 26 days.

(21) Appl. No.: 12/256,346

(22) Filed: Oct. 22, 2008

(65) Prior Publication Data

US 2009/0104302 A1   Apr. 23, 2009

Related U.S. Application Data

(60) Provisional application No. 60/982,071, filed on Oct. 23, 2007.

(51) Int. Cl.
| | | |
|---|---|---|
| *B29C 51/20* | (2006.01) | |
| *B29C 51/08* | (2006.01) | |
| *B29C 51/26* | (2006.01) | |
| *B29K 23/00* | (2006.01) | |
| *B29K 25/00* | (2006.01) | |
| *B29K 67/00* | (2006.01) | |
| *B29L 31/00* | (2006.01) | |

(52) U.S. Cl.
CPC .............. *B29C 51/082* (2013.01); *B29C 51/262* (2013.01); *B29C 51/20* (2013.01); *B29K 2023/12* (2013.01); *B29K 2025/00* (2013.01); *B29K 2067/00* (2013.01); *B29L 2031/7132* (2013.01); *Y10S 425/048* (2013.01)
USPC ........... 425/398; 425/384; 425/394; 425/397; 425/400; 425/DIG. 48; 425/327; 425/343; 425/344; 425/416; 425/423

(58) Field of Classification Search
USPC .......... 425/398, 412, DIG. 48, 217, 327, 358, 425/384, 387.1, 395, 397, 407, 423, 501, 425/112, 343, 344, 347, 394, 399, 400, 416, 425/508, 521
See application file for complete search history.

(56) References Cited

U.S. PATENT DOCUMENTS

| | | | | |
|---|---|---|---|---|
| 2,973,558 | A * | 3/1961 | Stratton, Jr. ................... | 264/549 |
| 3,142,863 | A | 8/1964 | Mazzoni | |
| 3,161,915 | A | 12/1964 | Thiel | |
| 3,242,245 | A * | 3/1966 | Cunningham et al. ........ | 264/545 |
| 3,342,915 | A * | 9/1967 | Wanderer ...................... | 264/522 |
| 3,465,071 | A * | 9/1969 | Edwards ........................ | 264/550 |
| 3,466,355 | A * | 9/1969 | Kostur ........................... | 264/522 |
| 3,570,064 | A * | 3/1971 | De Groot ....................... | 425/347 |
| 3,726,953 | A * | 4/1973 | Jones et al. .................... | 264/547 |
| 3,749,542 | A * | 7/1973 | Shelby ........................... | 425/388 |
| 3,814,784 | A * | 6/1974 | Wolf .............................. | 264/549 |
| 3,837,782 | A | 9/1974 | Meissner et al. | |
| 3,920,371 | A * | 11/1975 | Faller ............................ | 425/388 |
| 3,933,562 | A * | 1/1976 | Cruckshank et al. ......... | 156/250 |
| 4,009,981 | A | 3/1977 | Rosen | |
| 4,043,736 | A * | 8/1977 | Andres et al. ................. | 425/397 |
| 4,086,045 | A * | 4/1978 | Thiel et al. ................. | 425/326.1 |

(Continued)

FOREIGN PATENT DOCUMENTS

GB          2149717          11/1984

*Primary Examiner* — Seyed Masoud Malekzadeh
(74) *Attorney, Agent, or Firm* — Wells St. John P.S.

(57) ABSTRACT

A cup thermoforming machine includes a frame, a movable upper platen, a clamping grid and a movable lower platen. The movable upper platen is supported for vertical reciprocation by the frame, and carries a male die. The clamping grid is carried by the frame above a sheet of thermoformable material and has a clearance aperture for the male die. The lower platen is supported for vertical reciprocation by the frame beneath the clamping grid and carries a female die.

20 Claims, 17 Drawing Sheets

(56) References Cited

U.S. PATENT DOCUMENTS

| | | | |
|---|---|---|---|
| 4,149,841 A | 4/1979 | Patterson | |
| 4,239,727 A * | 12/1980 | Myers et al. | 264/550 |
| 4,328,067 A | 5/1982 | Cesano | |
| 4,368,024 A | 1/1983 | Asano | |
| 4,464,329 A * | 8/1984 | Whiteside et al. | 264/544 |
| 4,560,339 A | 12/1985 | Padovani | |
| 4,563,325 A * | 1/1986 | Coffman | 264/550 |
| 4,778,372 A * | 10/1988 | Mutti et al. | 425/294 |
| 4,872,826 A | 10/1989 | Padovani | |
| 4,878,826 A | 11/1989 | Wendt | |
| 4,971,541 A | 11/1990 | Onnenberg et al. | |
| 5,130,071 A | 7/1992 | Iseler et al. | |
| 5,198,175 A * | 3/1993 | Kato et al. | 264/512 |
| 5,307,610 A | 5/1994 | Schneider et al. | |
| 5,385,465 A * | 1/1995 | Greiwe et al. | 425/308 |
| 5,641,524 A * | 6/1997 | Rush et al. | 425/384 |
| 5,773,540 A | 6/1998 | Irwin et al. | |
| 5,879,612 A * | 3/1999 | Zeiter et al. | 264/292 |
| 6,203,751 B1 * | 3/2001 | Rolle et al. | 264/554 |
| 6,314,873 B1 * | 11/2001 | Lee et al. | 100/35 |
| 6,368,546 B1 * | 4/2002 | Sakamoto | 264/553 |
| 6,843,156 B1 * | 1/2005 | Irwin | 83/228 |
| 7,104,172 B2 * | 9/2006 | Irwin | 83/50 |
| 7,168,354 B2 * | 1/2007 | Irwin | 83/365 |
| 7,210,606 B2 * | 5/2007 | Irwin et al. | 226/97.3 |
| 7,415,914 B2 * | 8/2008 | Irwin | 83/365 |
| 7,582,249 B2 * | 9/2009 | Iwasaki et al. | 264/549 |
| 7,985,062 B2 * | 7/2011 | Chesney | 425/342.1 |
| 8,071,213 B2 * | 12/2011 | Ikeyama et al. | 428/398 |
| 2006/0151924 A1 * | 7/2006 | Iwasaki et al. | 264/544 |

* cited by examiner

US 8,926,310 B2

CUP THERMOFORMING MACHINE

RELATED PATENT DATA

This application claims priority from U.S. Provisional Patent Application Ser. No. 60/982,071, which was filed Oct. 23, 2007, and which is incorporated by reference herein.

TECHNICAL FIELD

This invention pertains to apparatus and methods for thermoforming thin walled plastic articles. More particularly, the present invention relates to thermoforming machines and dies for forming thin walled plastic articles, such as cups.

BACKGROUND OF THE INVENTION

Numerous problems are encountered when thermoforming plastic articles, such as plastic cups. However, some plastic materials such as polypropylene, tend to droop or sag after they are heated and while they are being delivered into a thermoforming machine for molding between co-acting male and female dies.

FIG. 1 illustrates one present system for supporting plastic sheet material that tends to droop during a thermoforming operation. More particularly, a thermoforming machine 10 is provided with a presently understood mold assembly including an upper female die platen 12, a lower male die platen 14, a clamping grid 16 supported above a thermoformable plastic sheet 34, conveyor rails 24,26, sag rails 28-30, and a heating oven 32. In order to accommodate types of plastic sheet material 34 that tend to droop via gravity when heated, conveyor rails 24, 26 are splayed outwardly in a downstream travel direction. Splaying of the rails can over-stress the rails, leading to excessive wear and eventual break down. Additionally, sag rails 28-30 are provided through oven 32 and immediately upstream and adjacent to clamping grid 16 of thermoforming machine 10 to support sheet 34 from sagging and to reduce or (hopefully) eliminate contact of sheet 34 with the top of clamping grid 22. Such contact can damage or ruin a surface finish on sheet 34, which can also damage surface finish on products molded from thermoforming machine 10. For example, contact of heated sheet 34 with a top of clamping grid 16 will cool sheet 34 at the contact site, which tends to cool the sheet at the contact point, resulting in non-uniform heat within the sheet. This can negatively affect formability. Furthermore, it can produce wrinkles in the sheet 34.

In operation, female dies 18 are provided on a bottom surface of platen 12 within a female die plate that is affixed to platen 12. Individual male dies 20 are also provided atop a male die plate mounted atop platen 14. Bores 22 are provided through clamping grid 22. In operation, clamping grid is held stationary, just below sheet 34 which is delivered directly above. Platen 12 is driven downwardly to clamp sheet 34 against the top of grid 22, while sheet 34 is held stationary. Subsequently, platen 14 is driven upwardly to drive male dies 20 through bores 22, drawing sheet 34 into female dies 18.

Improvements are needed to eliminate the need for sag rails and splaying of conveyor rails 24,26 in order to reduce or eliminate sag of sheet 34 during a thermoforming operation.

SUMMARY OF THE INVENTION

A thermoforming machine is provided with a stationary clamping grid, or frame, that is supported above a heated and conveyed thermoformable plastic sheet, while female dies are supported below the clamping plate for upward clamping of the sheet against the grid, while male dies are supported above the sheet for subsequent downward delivery through bores in the clamping plate for driving the heated sheet into the respective female dies for forming. Placement of the clamping plate above the heated sheet in combination with upward movement of the female dies for clamping the sheet eliminates contact between the sheet and the clamping plate which can damage surface finish of the sheet and damage any resulting molded articles.

According to one aspect, a cup thermoforming machine is provided including a frame, a movable upper platen, a clamping grid and a movable lower platen. The movable upper platen is supported for vertical reciprocation by the frame, and carries a male die. The clamping grid is carried by the frame above a sheet of thermoformable material and has a clearance aperture for the male die. The lower platen is supported for vertical reciprocation by the frame beneath the clamping grid and carries a female die.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention for a thermoforming machine having die platens, dies and a clamping member suitable for use with thermoformable plastic materials that tend to sag during a thermoforming heating and conveying operation. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 2:
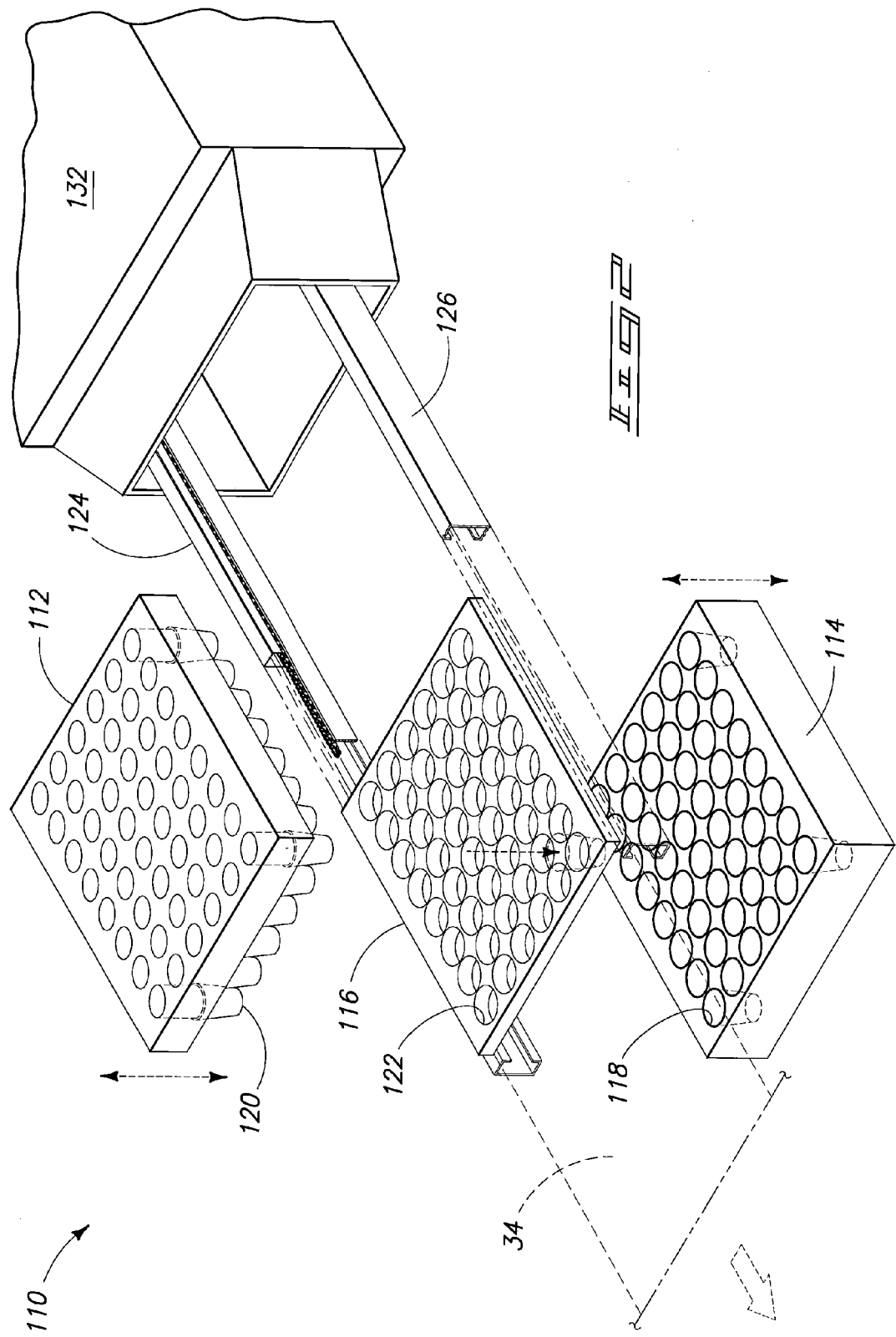
FIG. 2 is a simplified schematic perspective view of a thermoforming operation for use with heated plastic sheet materials that have a tendency to droop or sag when heated up and using a thermoforming machine and die assembly, according to one aspect of the present invention.

A thermoforming machine 110 is shown in simplified view in FIG. 2. More particularly, an upper platen 112 supports a male die plate including a plurality of male dies 120 above a heated thermoformable sheet 34. A lower platen 114 supports a female die plate including a plurality of female dies 118 corresponding with each of male dies 120 on platen 112. A stationary clamping grid, or clamping plate 116 includes a plurality of through bores 122 configured to allow passage of individual male dies 120 therethrough and into respective female dies 118. Conveyor, or chain rails 124 and 126 are constructed in a parallel configuration, extending completely through a heating oven 132 and through thermoforming machine 110. A thermoformable sheet 34 of plastic material that is susceptible to drooping when heated is carried between chain rails 124 and 126 for passage beneath clamping grid 116. Lower platen 114 is retracted in a downward position while sheet 34 is moved. Accordingly, it is acceptable for sheet 34 to droop, or sag since clearance is provided between female dies 118 and sheet 34 while sheet 34 is being moved via rails 124 and 126 between successive forming operations. During a forming operation, sheet 34 is held stationary between rails 124 and 126.

During a forming operation, lower platen 114 and female dies 118 are first driven upwardly to clamp sheet 34 between a top surface of female dies 118 and a bottom surface of clamping grid 116. Subsequently, upper platen 112 is driven downwardly, driving individual male dies 120 through bores 122 so as to drive heated sheet 34 into respective female dies 118 while sheet 34 is clamped in order to form articles therein.

The provision of a stationary clamping plate 116 above a heated sheet 34 provides a significant improvement when utilizing plastic thermoformable sheet materials that are susceptible to drooping or sagging when heated and conveyed. One exemplary material is polypropylene. Other exemplary materials are high impact plastic (HIPS), polyethylene terpthalate (PET), or polystyrene.

Figure 1:
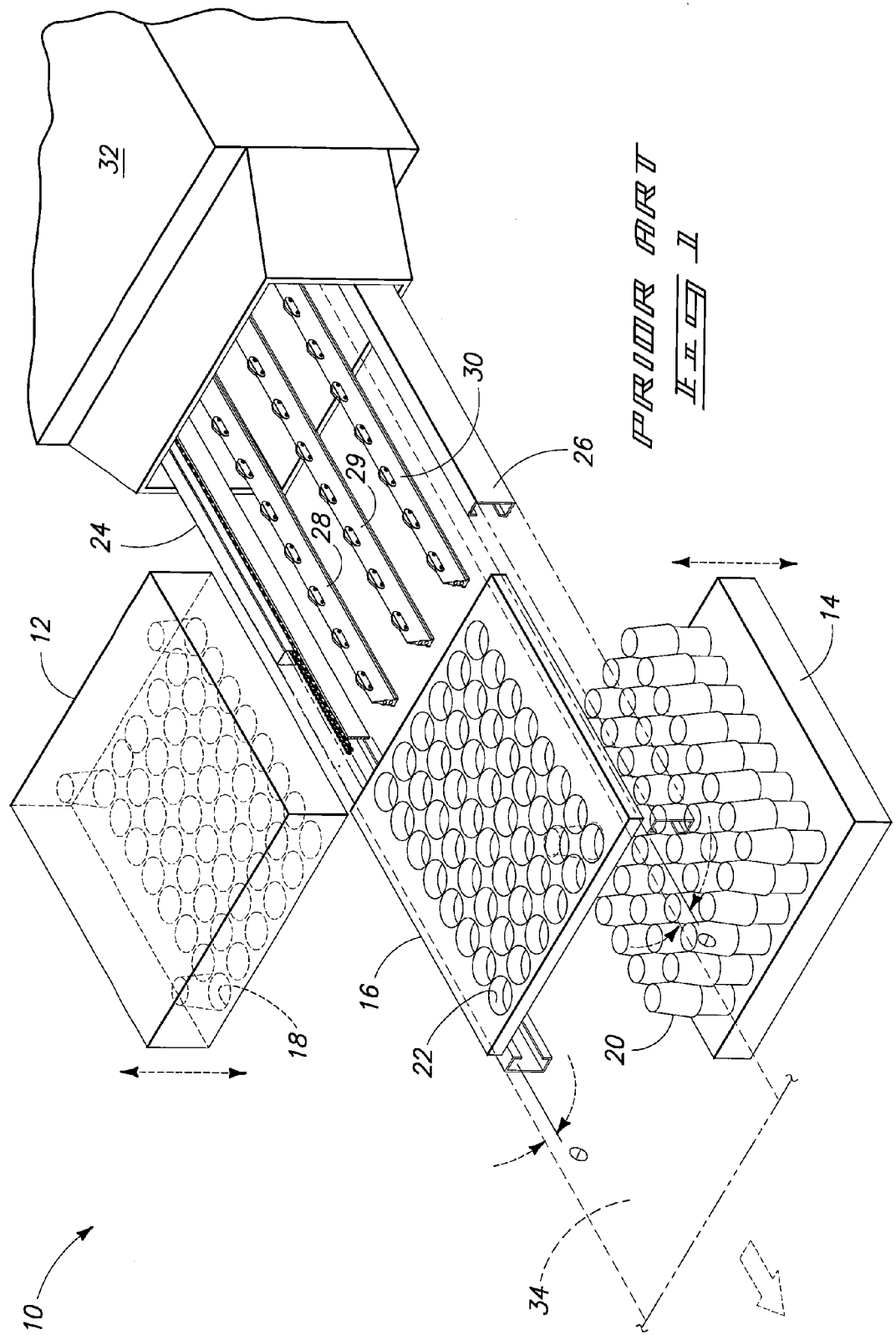
FIG. 1 is a simplified schematic perspective view of a prior art thermoforming operation for use with heated plastic sheet materials that have a tendency to droop or sag when heated up and during use in a thermoforming operation.

In contrast, the prior art technique depicted in FIG. 1 causes problems with sheets of material that droop because the sheet of material droops or sags and contacts the clamping member while being moved. According to the prior art technique depicted in FIG. 1, a thermoforming machine forms articles in an upward direction; whereas, the present technique depicted in FIG. 2 forms articles in a downward direction. Such a "form-down" operation utilizes clamping plate 116 above thermoformable sheet 34 which reduces or eliminates the need for splaying of rails 124,126 and/or providing for sag rails as is utilized in the prior art when dealing with thermoformable sheets 34 that are susceptible to sagging when heated. Accordingly, significant problems in the prior art are overcome by providing clamping plate 116 above sheet 34, in combination with providing for downward forming of male dies 120 into female dies 118. More particularly, the need to splay chain rails is eliminated; the need to add sag rails is eliminated; the need to provide a ramp on a back end of a form tool is eliminated; and web sag becomes acceptable, as there is no undesirable contact between a sagging web and a clamping grid or dies which can cause local cooling and surface imperfections in the sheet.

Figure 3:
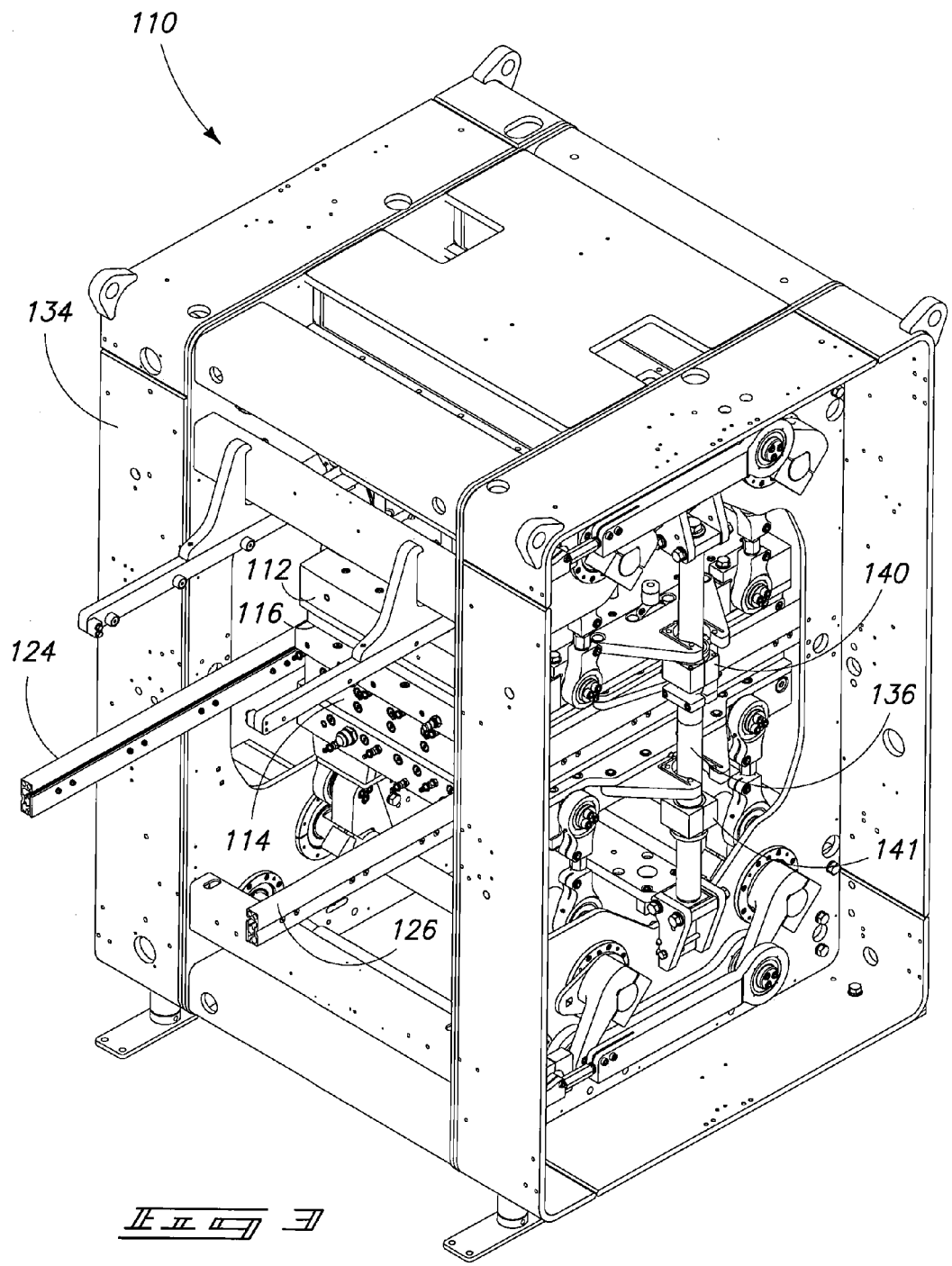
FIG. 3 is a perspective view of a thermoforming machine embodying features depicted in FIG. 2.

FIG. 3 illustrates one suitable construction for a thermoforming machine 110 having upper platen 112, lower platen 114 and stationary clamping grid 116. Conveyor rails 124 and 126 pass completely through thermoforming machine 110 for conveying a heated sheet of thermoformable material therethrough during a forming operation.

Figure 5:
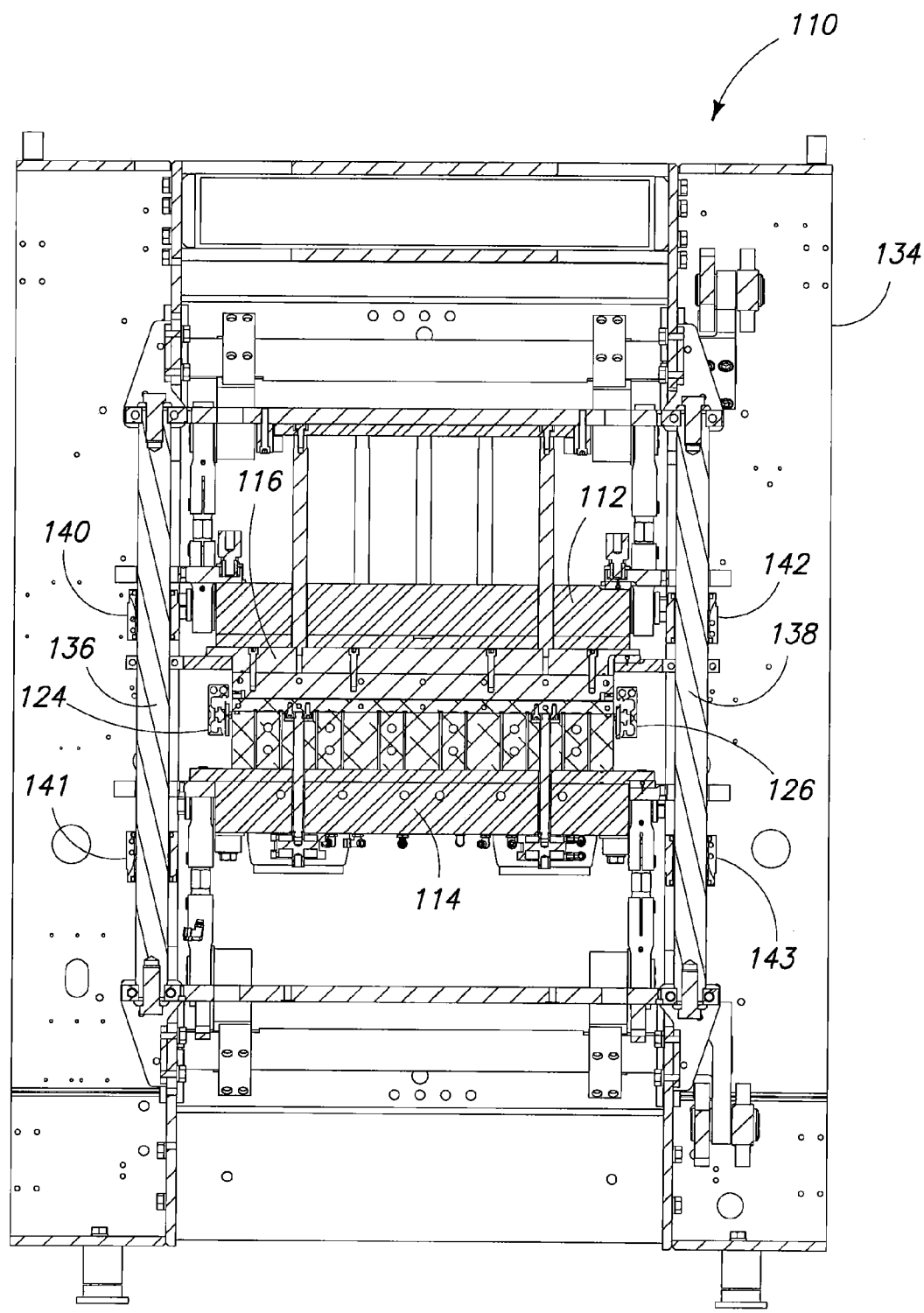
FIG. 5 is a vertical sectional view of the thermoforming machine taken along line 5-5 of FIG. 4.
Figure 6:
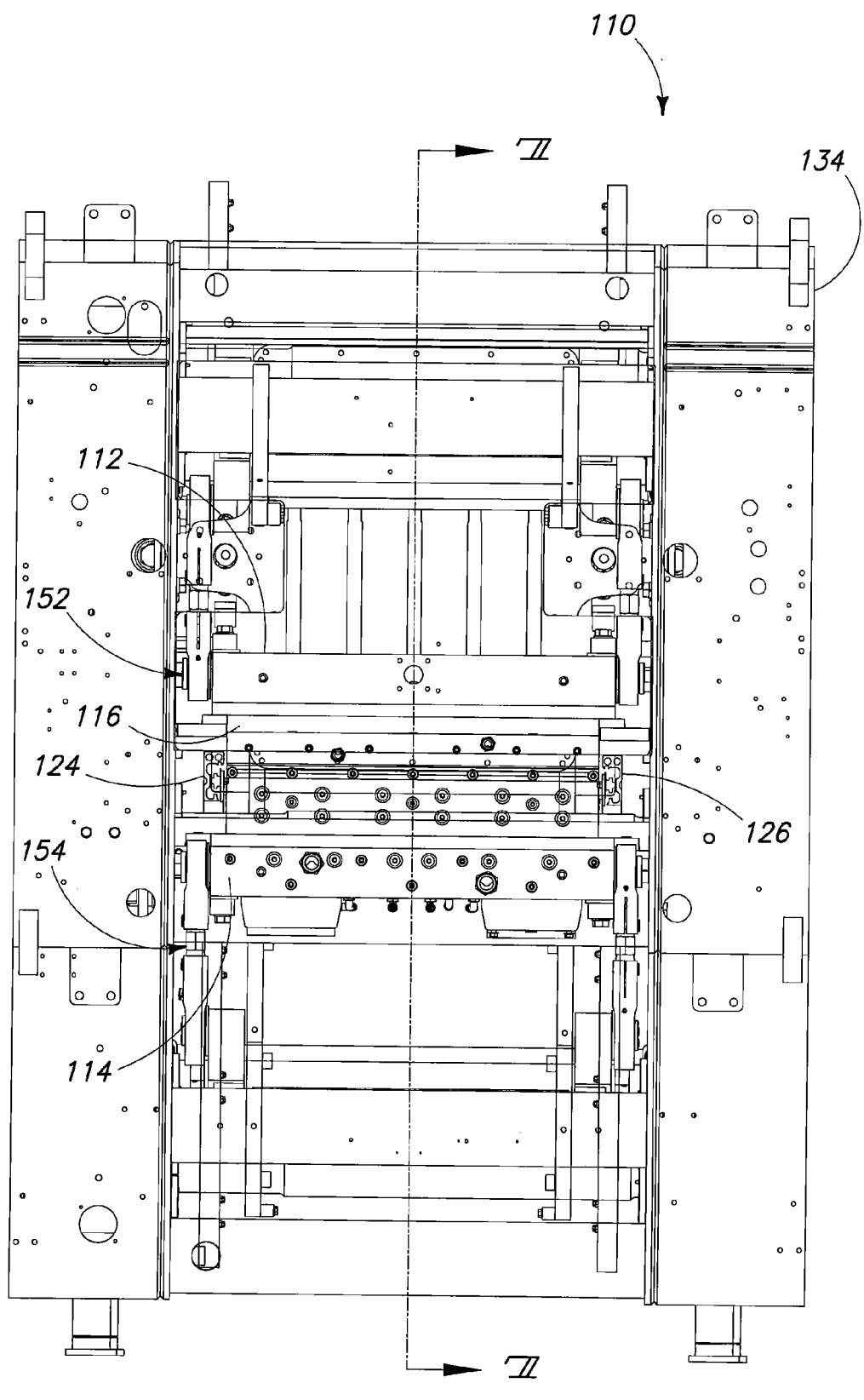
FIG. 6 is a vertical exit end view of the thermoforming machine of FIGS. 3-5.
Figure 7:
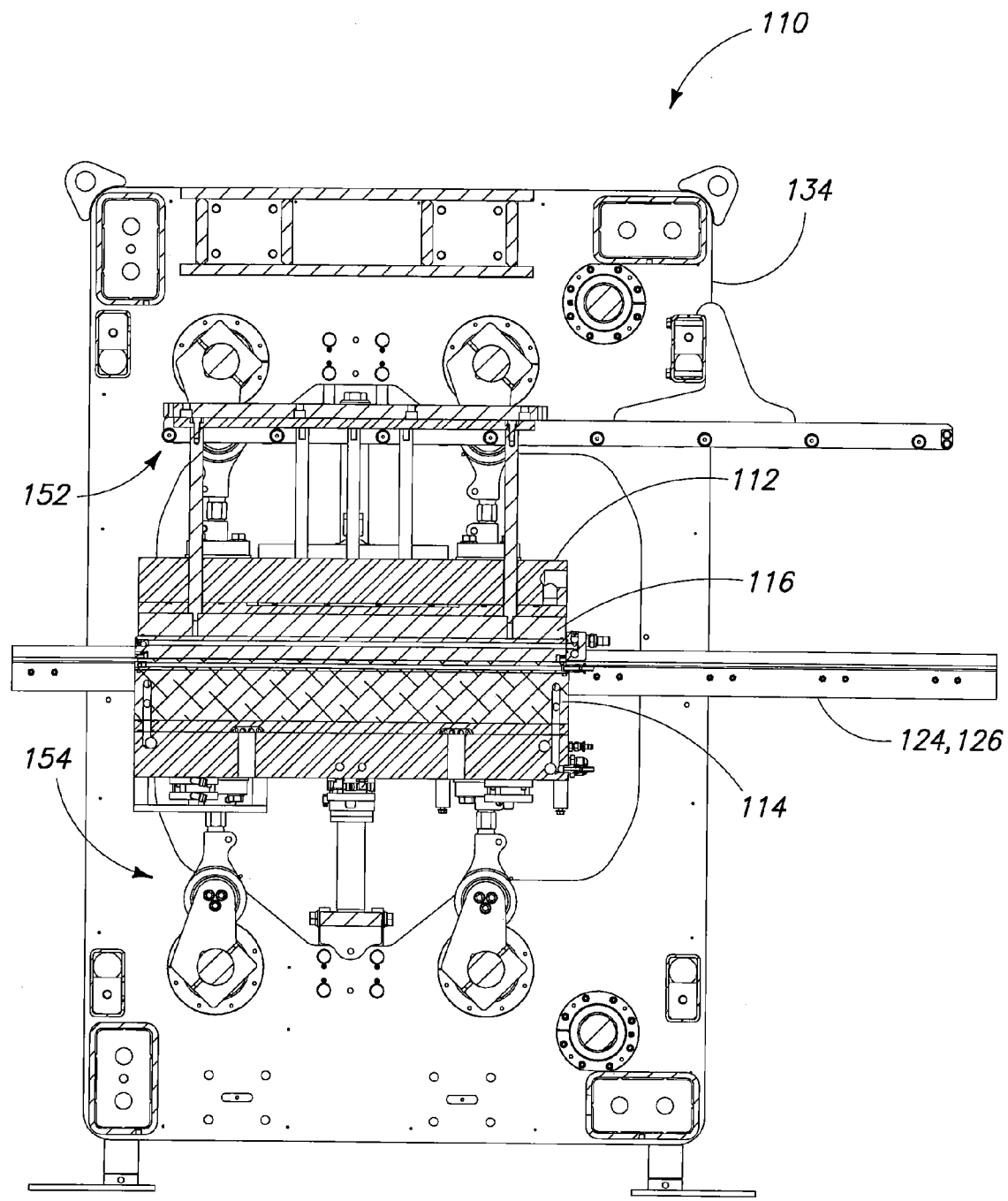
FIG. 7 is a vertical sectional view taken along line 7-7 of FIG. 6.
Figure 8:
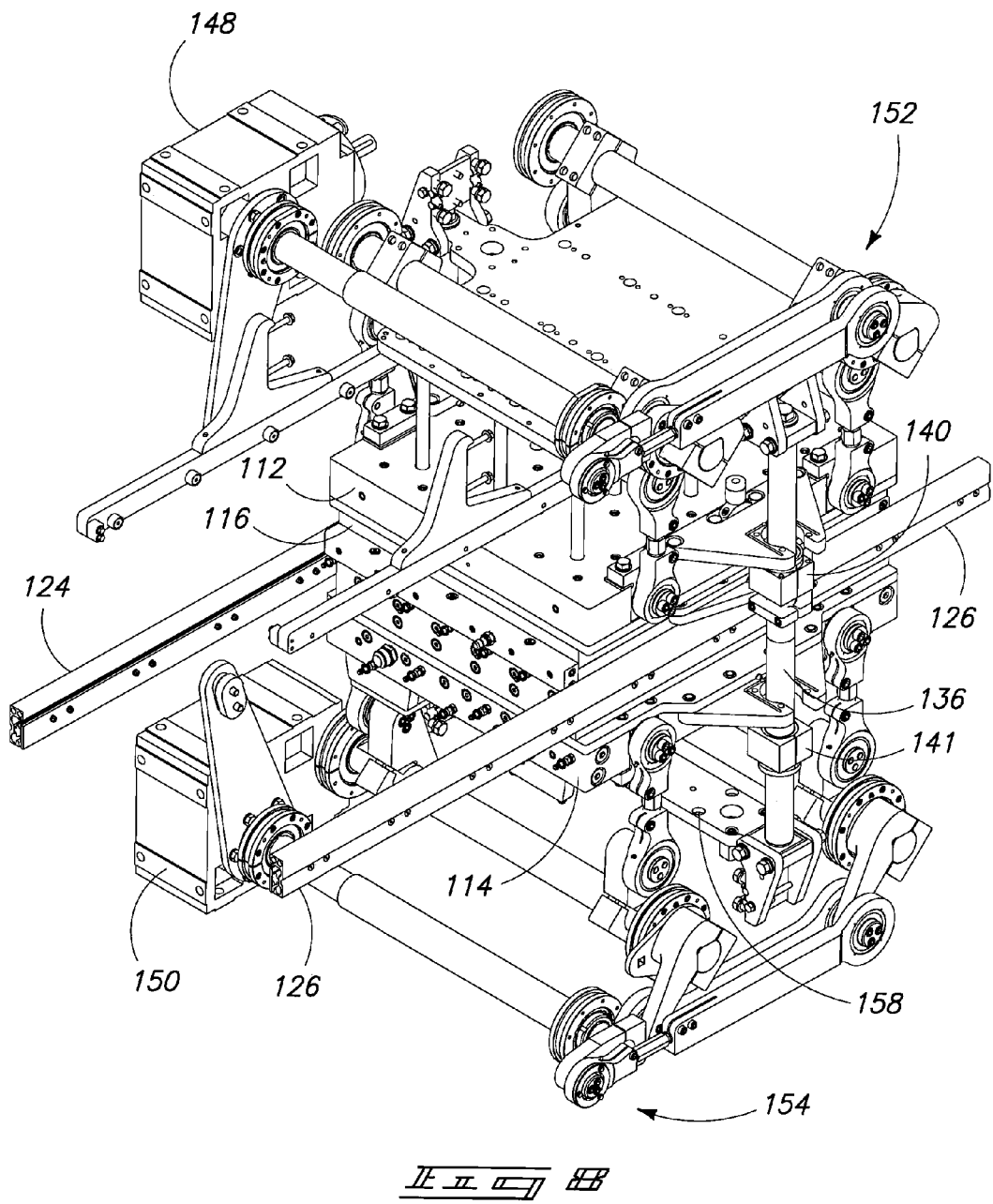
FIG. 8 is perspective view of the thermoforming machine of FIG. 3 with the frame removed to facilitate viewing of the drive mechanisms, the top platen, the bottom platen, and the clamping grid frame.

As shown in FIG. 3, thermoforming machine 110 includes a rigid steel frame 134 and a pair of stationary guide rods 136 and 138 (see FIG. 5). A pair of bushings 140,141 and 142,143 (see FIG. 5) guide upper platen 112 and lower platen 114, respectively for vertical reciprocation therebetween. As shown in FIGS. 6-8, upper and lower kinematic drive linkages 152 and 154 drive upper and lower platens 112 and 114, respectively. Respective modern rotary electric servo drive motors 148 and 150 independently drive linkages 152,154 and platens 112,114, respectively. Such motors are driven by a computer control system, as is presently understood in the art. Other kinematic linkages and drive motor arrangements can be used in the alternative.

More particularly, kinematic linkages 152 and 154 each comprise drive linkages that are formed from a pair of top and bottom crank arm assemblies, respectively. Each assembly is formed from a crank arm linkage and a four-bar linkage. The crank arm linkage drives the four-bar linkage in an oscillating motion. Each platen 112 and 114 is driven by kinematic linkage 152 and 154, respectively, in substantially non-rotating linear, vertical motion. Guide posts 136 and 138 further limit such motion to vertical reciprocating motion. Kinematic linkages 152 and 154 are driven by servo drive motors 148 and 150 (see FIG. 4). This action causes coacting engagement of a top edge of cavities, or female dies on the lower platen with the clamping grid, or clamping member 16, and mating of male dies or plugs 120 and web, or sheet 34 with female dies, or cavities 118.

More particularly, each drive system, including the motor and associated drive controller, forms the motor of an associated rotary press. This rotary press attaches to a rotating crank arm assembly that moves the associated four-bar linkage. The linkage causes the attached platen to move up and down in response to rotation of the drive. Accordingly, a single revolution of drive motors 148 and 150 will produce a corresponding complete press cycle of both the upper and lower platens, respectively. Hence, a complete cycle of each drive will return the press to a starting, or closed position. For example, when lower drive motor 150 is at an initial rotated position of zero degrees, the lower platen 114 is closed upwardly onto the thermoformable sheet, or web. Similarly, when lower driven motor 150 is rotated to 180 degrees, the lower platen 114 is completely open. Likewise, the same holds true for upper drive motor 148 and upper platen 112.

As shown in FIGS. 3-7, guide posts 136 and 138 are rigidly supported by frame 134 of thermoforming machine 110.

Figure 4:
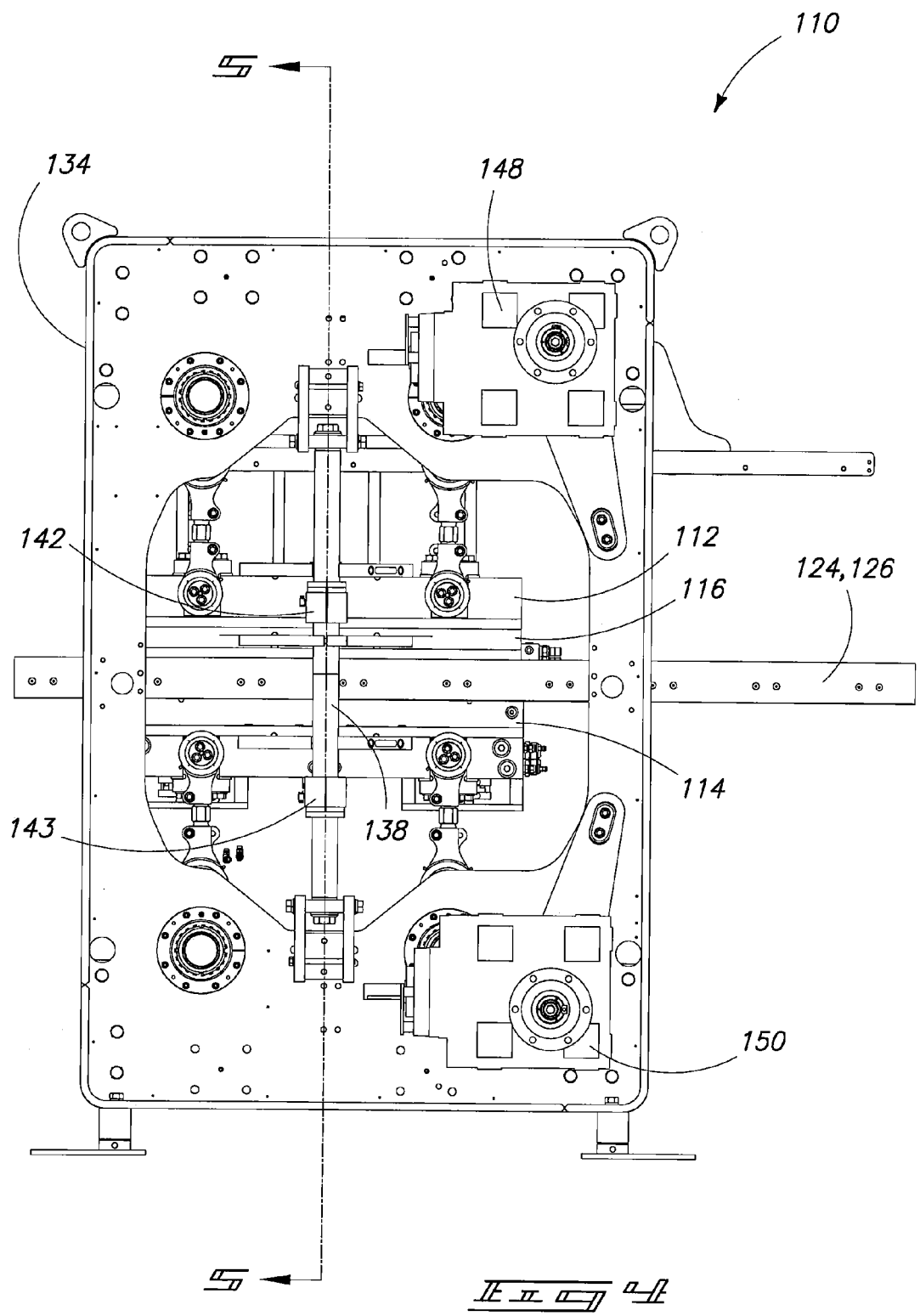
FIG. 4 is a vertical side view of the thermoforming machine of FIG. 3.

Preferably, a modern rotary electric servo drive motor, or actuating device, is used for drive motors 148 and 150 (see FIG. 4). Such a drive includes an AC servo motor and an associated servo drive motor controller. For example, one suitable AC motor is sold by Siemens AG, Automation Group, Automation Systems for Machine Tools, Robots and Special-Purpose Machines, P.O. Box 31 AD, D-91050, Erlangen, Federal Republic of Germany. Additionally, one suitable servo drive motor controller is sold by Siemens as an analog feed drive system including the SIMO DRIVE 611-A Transistor PWM Inverters and Motors for AC FV Drives. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive.

Figure 10:
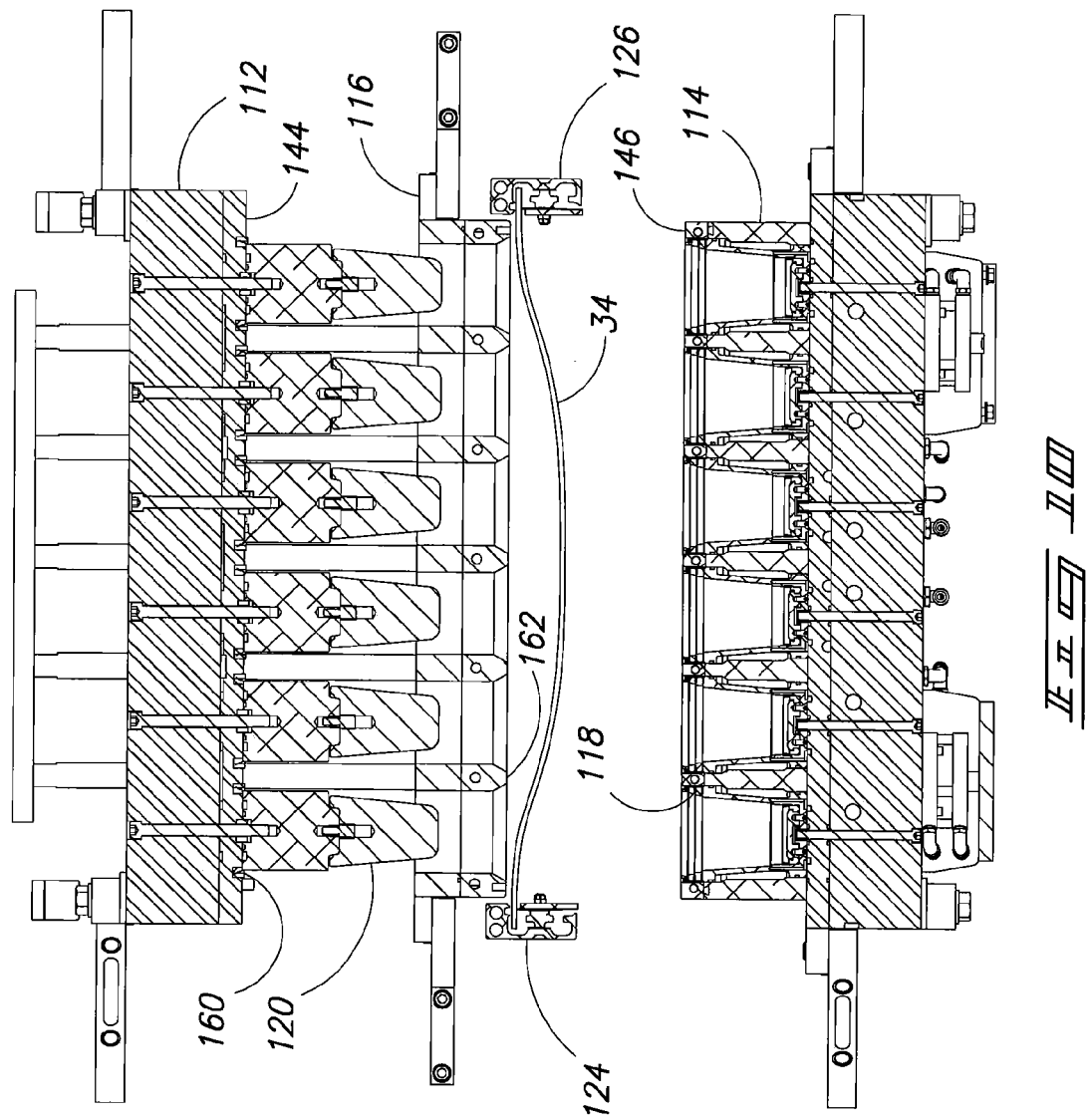
FIG. 10 is a vertical sectional view taken along line 10-10 of FIG. 9.

As shown in FIG. 10, a plurality of circumferential seals 160 are provided about each male die 120. Likewise, coining rings 162 are provided about each or within clamping grid 116.

It is understood that the clamping grid 16 forms a unitary grid, or clamping member beneath which a web or sheet of thermoformable material 34 is intermittently delivered forward after being heated in a "shot" during each intermittent motion forming cycle. Clearance is provided between a bottom surface of clamping grid 116 and a top surface of bottom platen 114 when in a lowered position while a heated web 34 is moved between forming cycles. A gap is provided between grid 116 and platen 114, when lowered, to accommodate sag of web 34, thereby eliminating any need for splaying conveyor rails or using sag rails. Clamping grid 16 forms a clamp that is provided above the heated sheet of thermoformable material. Clamping grid 16 is held in a stationary position above a sheet of heated thermoformable material with a female die and lower platen being carried for reciprocation upwardly so as to clamp the sheet intermittently between the clamping grid and the female die members. Subsequently, the top platen, carrying the male dies, is moved downwardly so as to draw the heated sheet of material into the respective female dies for forming of a thermoformed article therein.

As shown in FIG. 10, a die plate 144 on top platen 112 engages with a top surface of clamping grid 116 when top platen 112 is lowered completely. Likewise, a die plate 146 on bottom platen 114 engages with a bottom edge (coining rings 162) on clamping grid 116 when bottom platen 114 is raised completely. When lowered, bottom platen 114 provides clearance between coining rings 162 and plate 146 that is greater than the height of cups being formed between dies 118 and 120. For example, if 5 inch tall cups are being formed, there is provided approximately 6 inches of clearance which provides greater than 5 inches of room for web 34 to sag downwardly without contacting plate 146. For the case where polypropylene cups are being formed, heated web 34 can sag approximately 3 inches, in some cases. Web 34, in an unsagged state, defines a web plane where conveyor rails 124 and 126 support web 34 in a horizontal plane (unsagged) just below a plane in which coining rings 162 are provided. In one case, the web plane is approximately ¼ inch below the plane of coining rings 162.

As further shown in FIG. 10, the web sag clearance zone is provided between the clamping grid and a top-most surface of the lower platen that extends across and above an entirety of the plurality of female dies on the lower platen with a depth greater than a depth of the female dies when the lower platen is vertically reciprocated to a lowered position to provide clearance for a downwardly sagging portion of the heated web relative to the plurality of female dies. Positioning of the clamping grid above the heated web in combination with an upward movement of the plurality of female dies for clamping the heated web is configured to eliminate a contact between the heated web and the clamping grid which results in preventing damage to a surface finish of the heated web. In addition, a web sag clearance zone is provided between the clamping grid and a top-most surface of all of the female dies having a depth at least 16 percent of a width of the top-most surface of all the female dies being spanned when the lower platen is vertically reciprocated to a lowered position to provide clearance for a downwardly sagging portion of the heated web relative to the plurality of female dies.

In operation, bottom platen 114 is raised so that plate 146 engages web 34 into coining rings 162. Top platen 116 is subsequently and concurrently moved downwardly so that male plug 120 engages web 34 just after web 34 is clamped between coining rings 162 and plate 146. Other clearance dimensions and timed platen movements are possible. However, the above steps provide one preferred method of forming.

Figure 11:
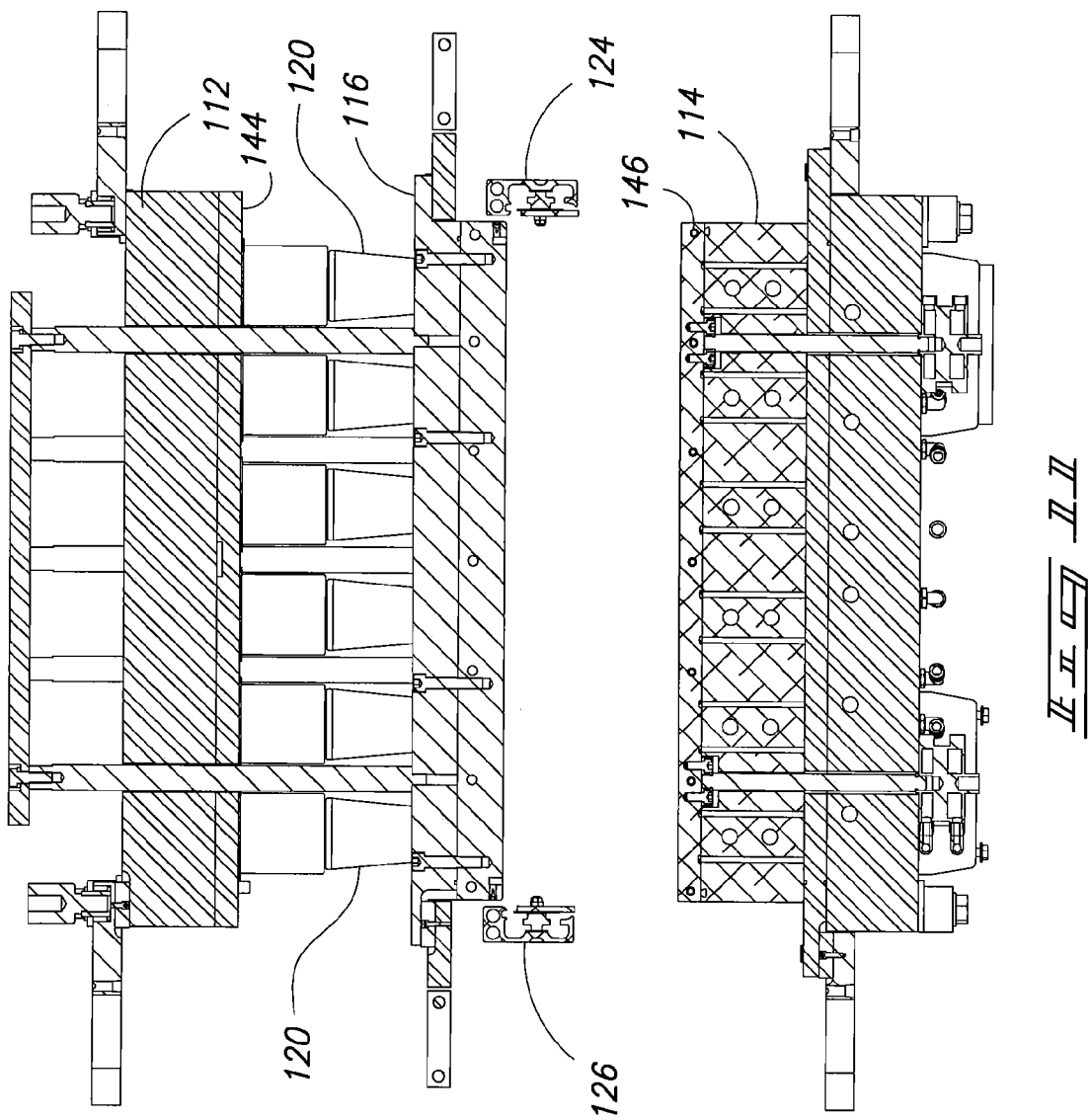
FIG. 11 is a vertical sectional view taken along line 11-11 of FIG. 9.
Figure 12:
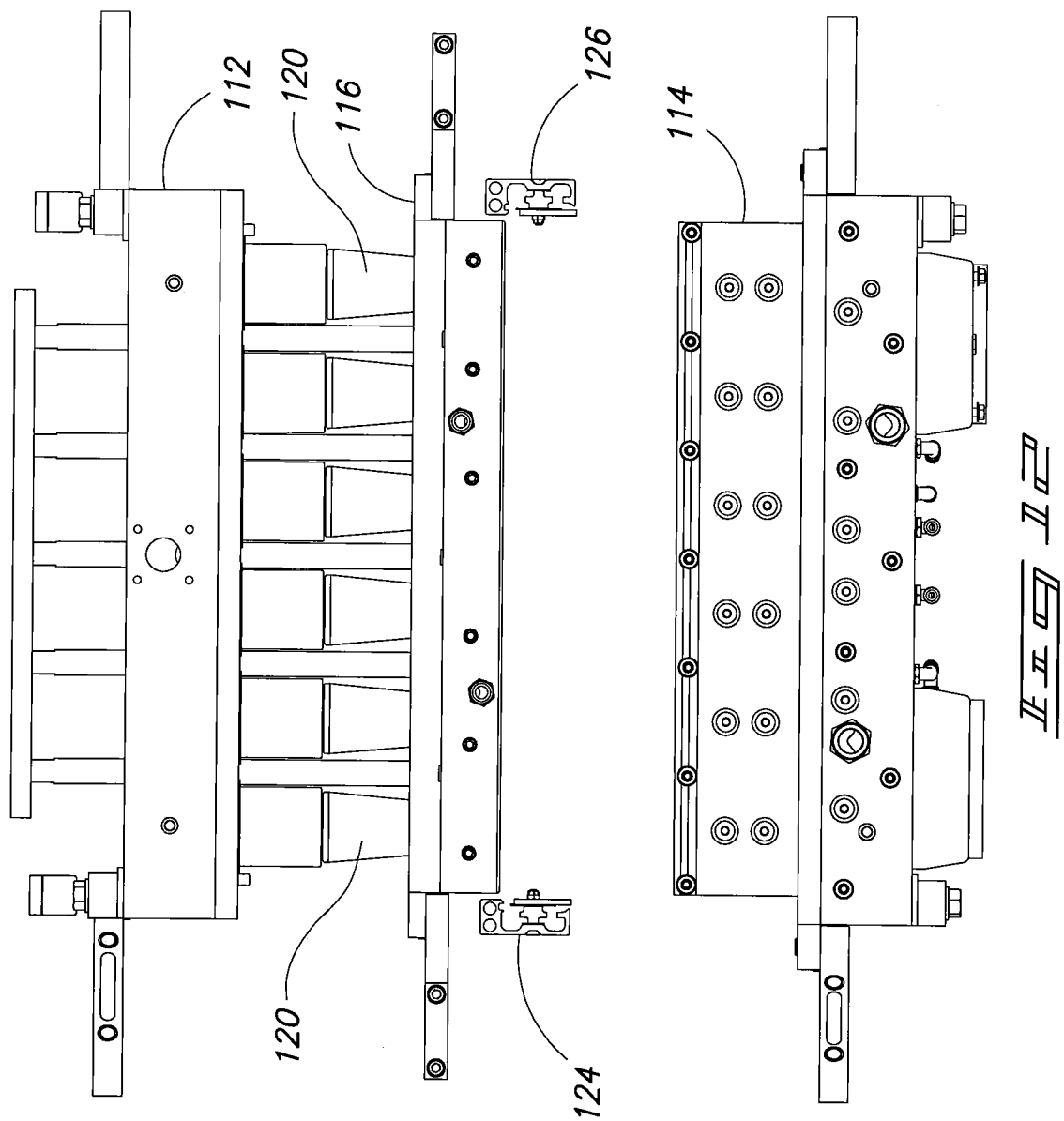
FIG. 12 is a vertical exit end view of the components of FIG. 9.

FIG. 11 is a vertical sectional view of platens 112 and 114 when fully raised and lowered, respectively. Plate 144 of top platen 112 will engage with a top surface of clamping grid 116 when fully lowered. Likewise, plate 146 will engage with a bottom surface (coining rings) on clamping grid 116 when fully raised. As shown in FIGS. 10 and 11, top platen 112 and bottom platen 114 are each constructed with die assemblies (male and female dies) being formed directly onto the platens. This enables removal of each of the entire platens 112 and 114 as single units from the forming machine. FIG. 12 is a vertical exit end view of the components of FIG. 11 showing conveyor rails 124 and 126 provided laterally outboard of of male dies 120, female dies 122, and clamping grid 116.

Figure 13:
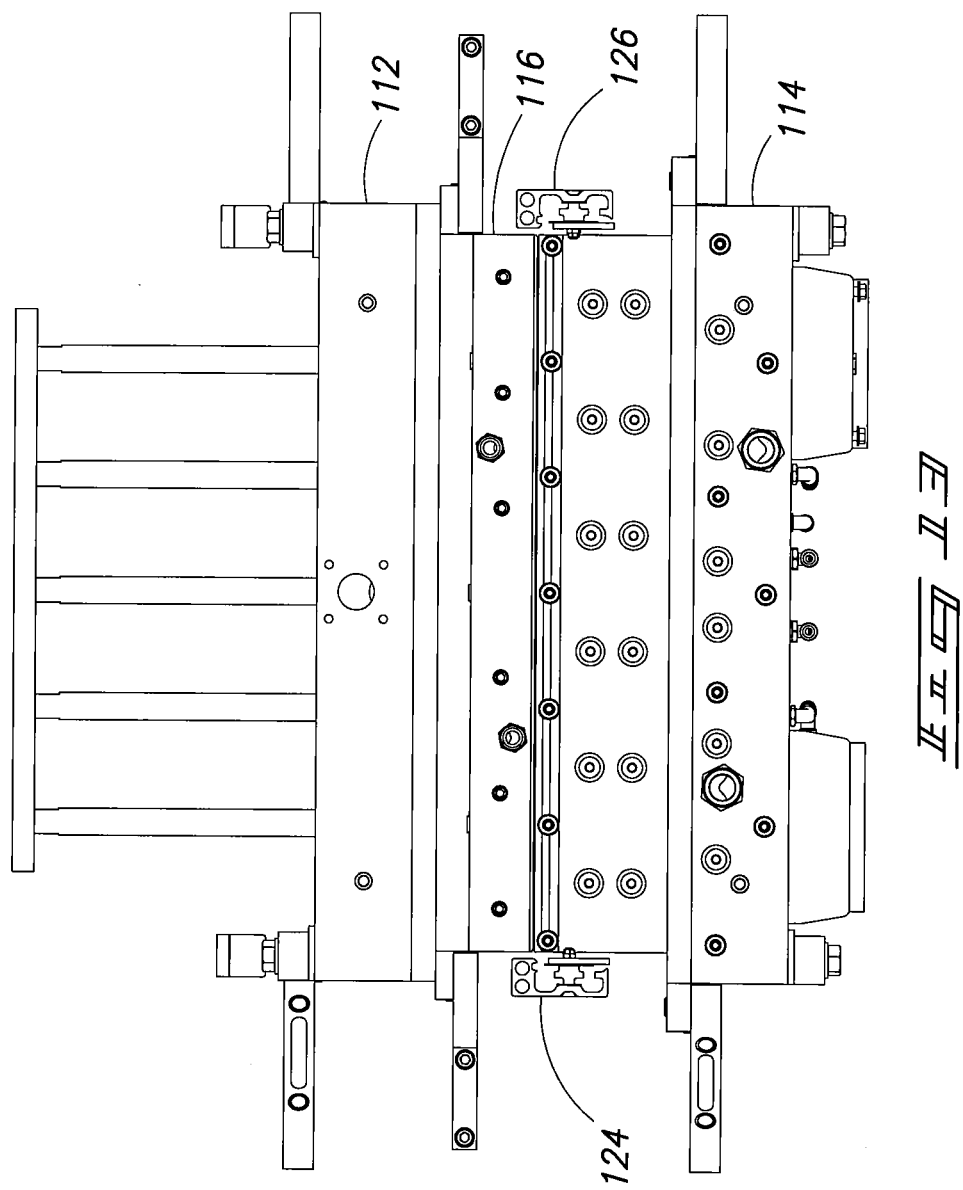
FIG. 13 is a vertical exit end view of the components of FIG. 12 with the platens closed together.

FIG. 13 is a vertical exit end view of the components of FIG. 12 showing top platen 112 and bottom platen 114 closed together into engagement with top and bottom surfaces of clamping grid 116, respectively.

Figure 9:
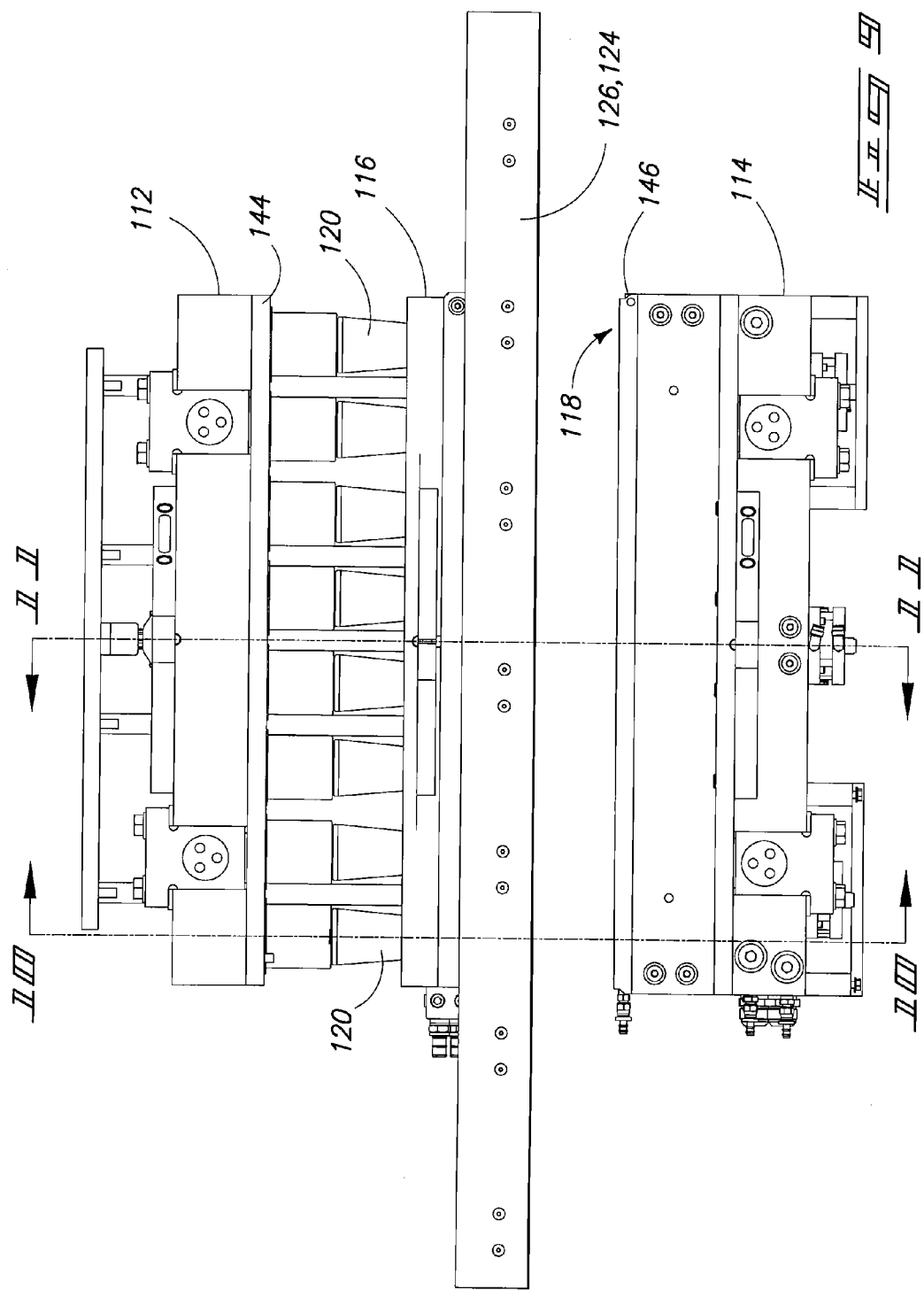
FIG. 9 is vertical side component view of the top platen, clamping grid, bottom platen and conveyor chain rails of FIG. 8, with the platens open.
Figure 14:
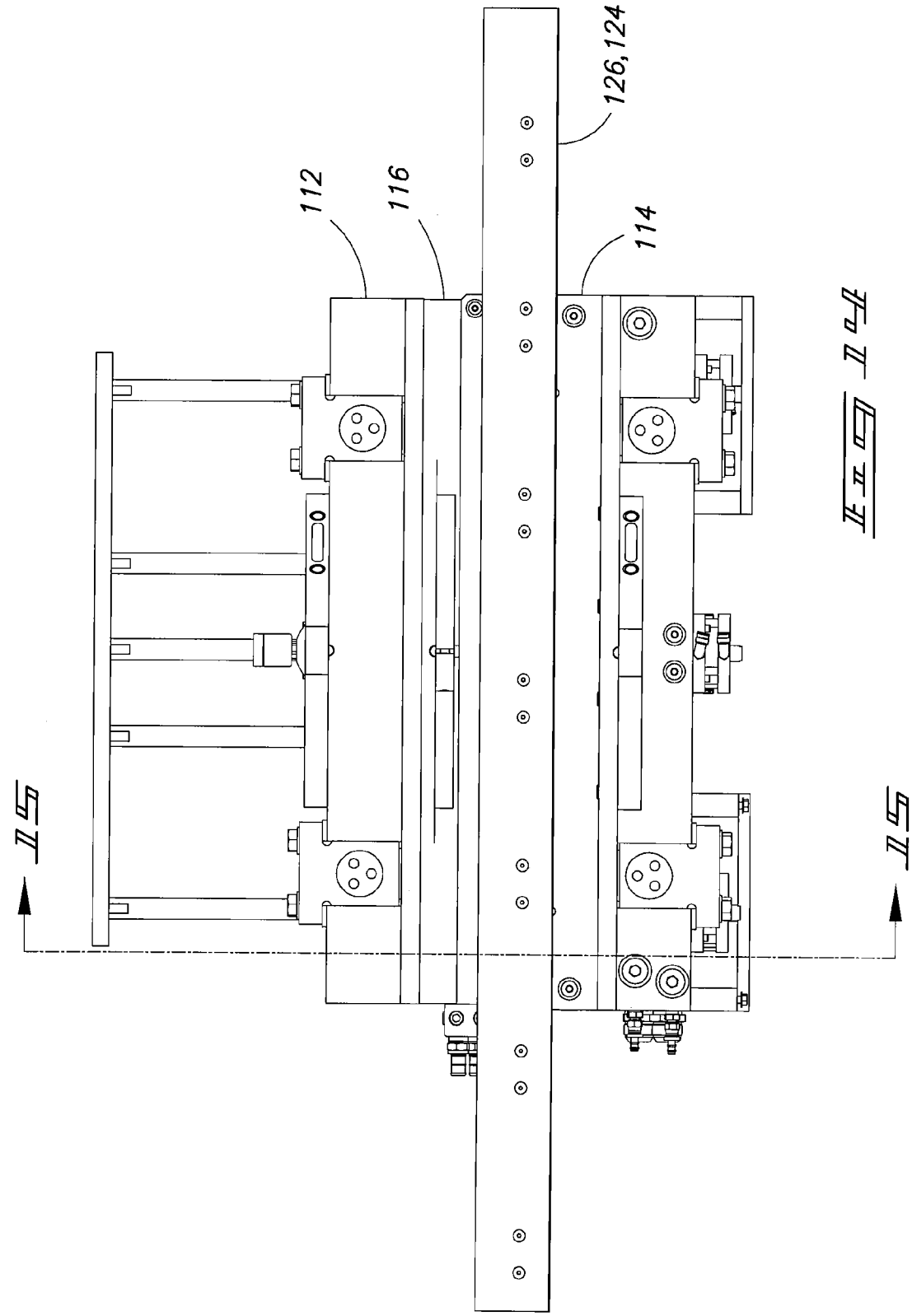
FIG. 14 is a vertical side component view of the components of FIG. 9 with the platens closed together.
Figure 15:
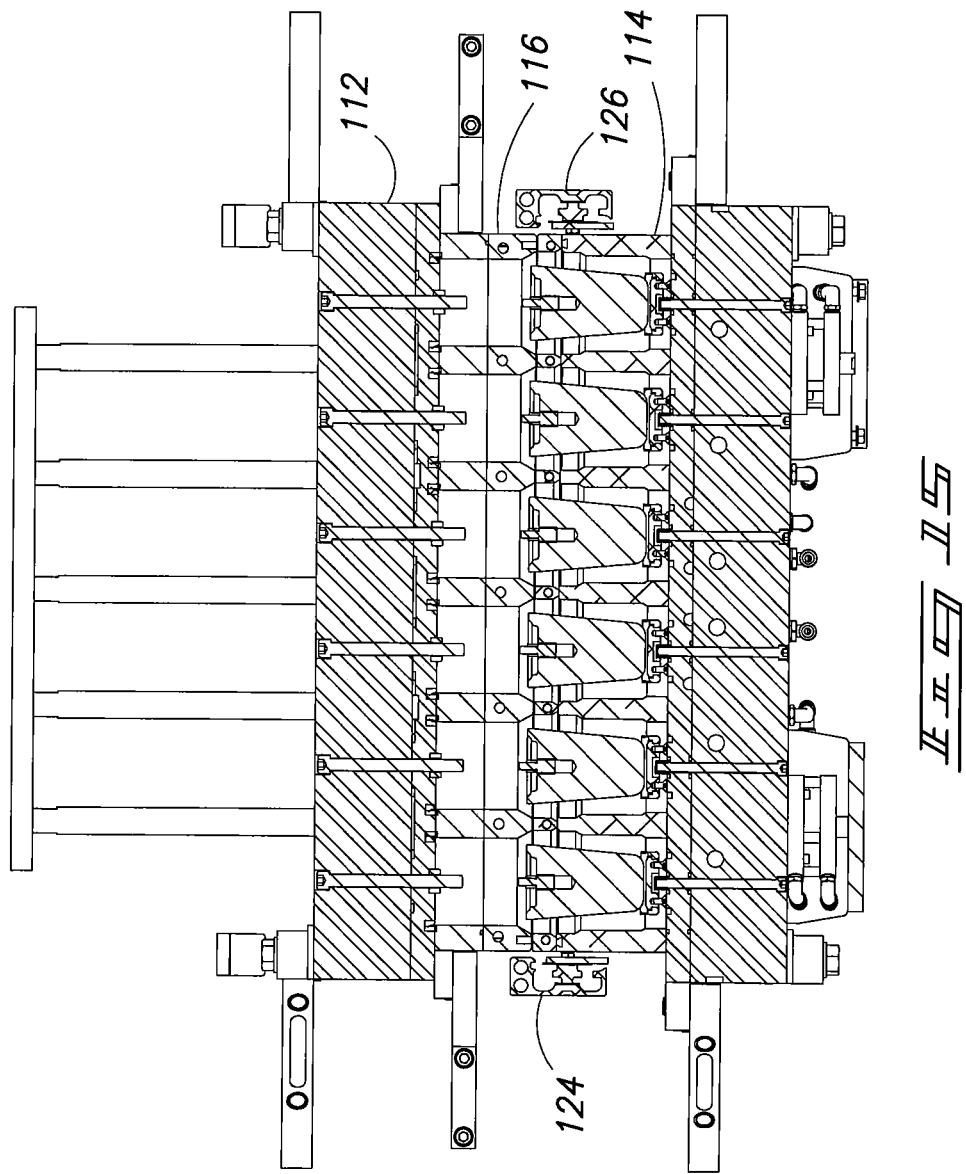
FIG. 15 is a vertical sectional view taken along line 15-15 of FIG. 14.

FIG. 14 is a vertical side component view of the components of FIG. 9 showing top platen 112 and bottom platen 114 closed together with clamping grid 116. FIG. 15 is a vertical sectional view of the components of FIG. 14. More particularly, coaction of male and female dies within platens 112 and 114 can be seen.

Figure 16:
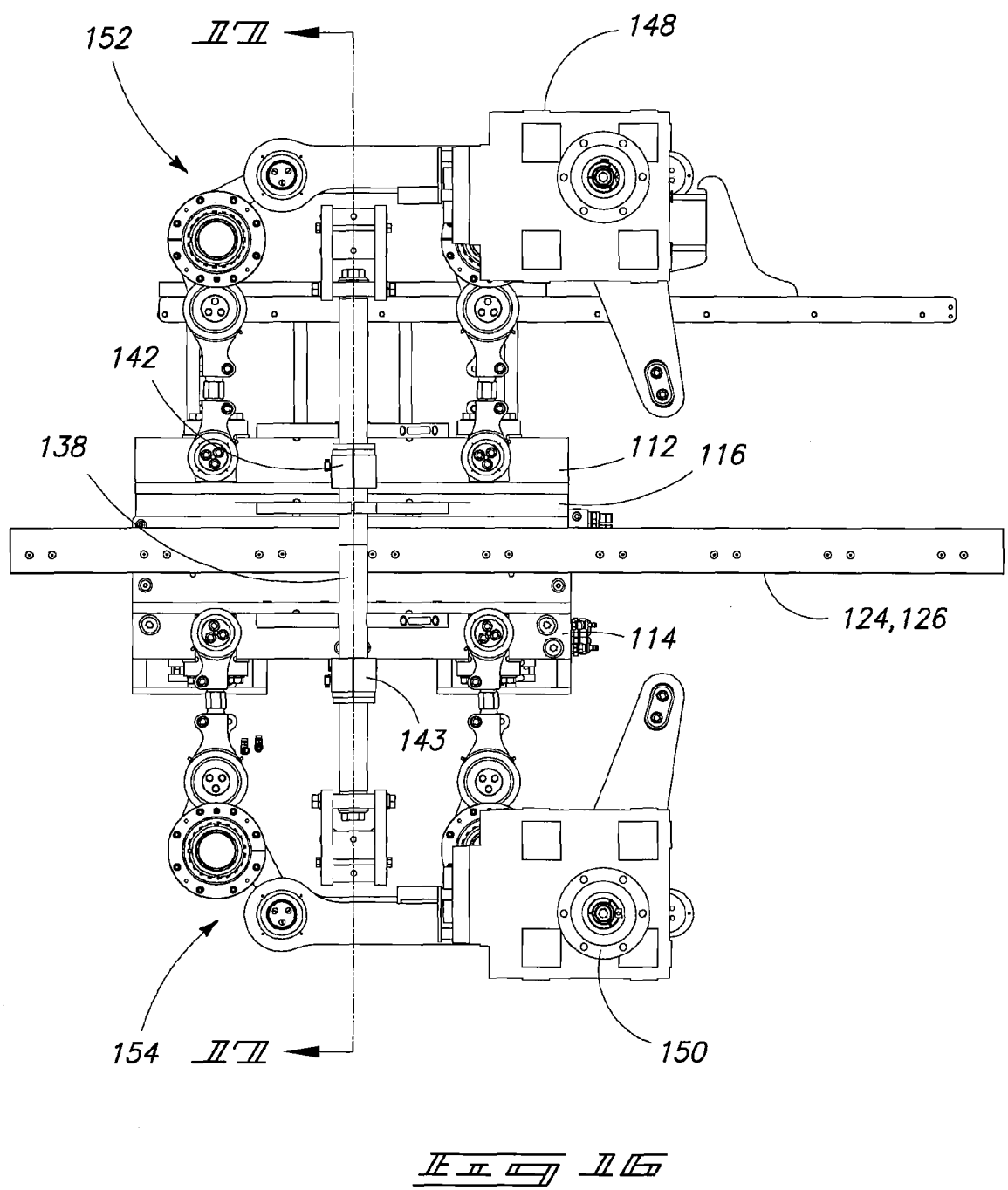
FIG. 16 is a vertical side view of the components of FIG. 8, but corresponding with the viewing direction of FIG. 7.

FIG. 16 is a vertical side view of the components of FIG. 8, but corresponding with the viewing direction of FIG. 7. Upper platen 112 is driven for vertical reciprocation via drive motor 148 and kinematic drive linkages 152, while lower platen 114 is driven for vertical counter-reciprocation via drive motor 150 and kinematic drive linkages 154. Platens 112 and 114 are guided for accurate vertical reciprocation via a pair of guide bushings 140,142 and 141,143, respectively, provided on opposite sides of each platen and accurately sized to be received in sliding relation over guide posts 136 and 138. Posts 136, 138 have a cylindrical shape and respective guide bushings 140,142 and 141, 143 complement the straight cylinders.

Figure 17:
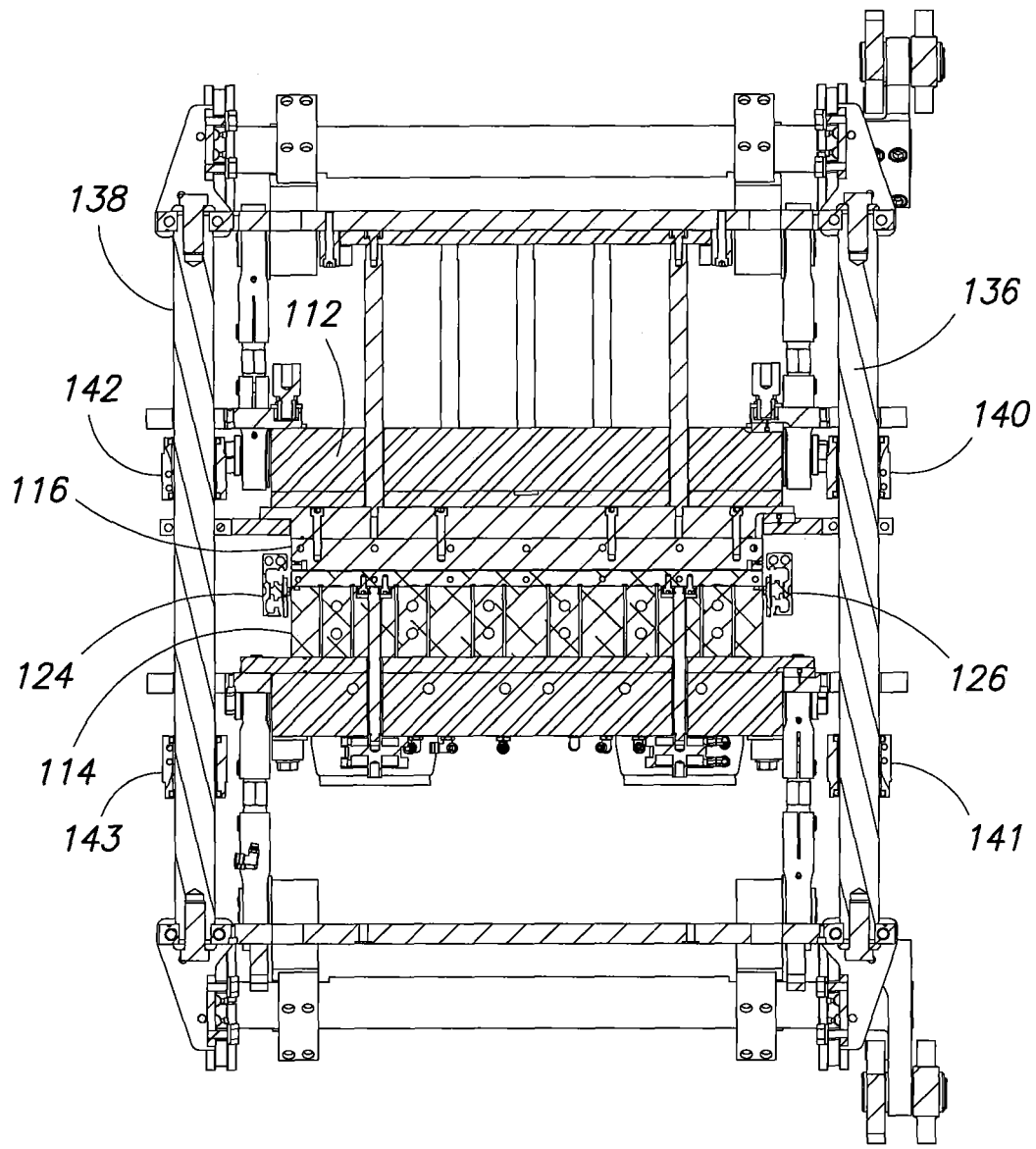
FIG. 17 is a vertical sectional view of the components of FIG. 16.

FIG. 17 is a vertical sectional view of the components of FIG. 16 depicting guide posts 136 and 138 relative to platens 112 and 114. Bushings 140-143 are shown in relation with platens 112 and 114.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A cup thermoforming machine, comprising:
a frame;
a movable upper platen supported for vertical reciprocation by the frame and carrying a plurality of male dies each configured to interact with a horizontally extending heated web of thermoformable material;
a stationary clamping grid carried by the frame above the heated web and having a respective clearance aperture for each of the male dies;
a movable lower platen supported for vertical reciprocation by the frame beneath the clamping grid and carrying a plurality of female dies; and
a web sag clearance zone provided between the clamping grid and a top-most surface of the lower platen that extends across and above an entirety of the plurality of female dies on the lower platen with a depth greater than a depth of the female dies when the lower platen is vertically reciprocated to a lowered position to provide clearance for a downwardly sagging portion of the heated web relative to the plurality of female dies;
wherein positioning of the clamping grid above the heated web in combination with an upward movement of the plurality of female dies for clamping the heated web is configured to eliminate a contact between the heated web and the clamping grid which results in preventing damage to a surface finish of the heated web.

2. The cup thermoforming machine of claim 1, further comprising a pair of laterally spaced apart conveyor rails provided outboard of the clamping grid and defining a web delivery plane provided beneath a bottom surface of the clamping grid.

3. The cup thermoforming machine of claim 2, wherein the lower platen has a top surface, when lowered to a bottom position, spaced from the web delivery plane greater than a height of the male die.

4. The cup thermoforming machine of claim 3, wherein a web sag gap provided between the web delivery plane and the lower platen is greater than a height of the male die when the lower platen is at the bottom position.

5. The cup thermoforming machine of claim 2, further comprising a first kinematic linkage and a first drive motor coupled together to drive the upper platen in vertical reciprocation between raised and lowered positions relative to the clamping grid, wherein the lowered position corresponds with a bottom surface of the upper platen engaging with a top surface of the clamping grid.

6. The cup thermoforming machine of claim 5, further comprising a second kinematic linkage and a second drive motor coupled together to drive the lower platen in vertical reciprocation between raised and lowered positions relative to the clamping grid, wherein the raised position corresponds with a top surface of the lower platen engaging with a bottom surface of the clamping grid.

7. The cup thermoforming machine of claim 2, wherein the clamping grid and the conveyor rails are supported by the frame in stationary locations, and the upper platen and the lower platen are moved vertically relative to the clamping grid.

8. The cup thermoforming machine of claim 7, wherein the lower platen is raised into engagement with the clamping grid before the upper platen is lowered into engagement with the clamping grid.

9. The cup thermoforming machine of claim 1, wherein a plurality of rows of male dies are provided on the upper platen and a plurality of complementary female dies are provided on the lower platen.

10. A thermoforming machine, comprising:
a frame;
a movable upper platen supported by the frame for vertical reciprocation and carrying a plurality of male dies configured to interact with a heated web of thermoformable material supported in a horizontally extending configuration;
a stationary clamping grid carried by the frame above the horizontally extending heated web of thermoformable material and having a respective clearance aperture for each of the male dies;
a movable lower platen supported by the frame for vertical reciprocation beneath the clamping grid and carrying a plurality of female dies configured to interact with the horizontally extending heated web of thermoformable material; and
a web sag clearance zone provided between the clamping grid and a top-most surface of all of the female dies having a depth at least 16 percent of a width of the top-most surface of all the female dies being spanned when the lower platen is vertically reciprocated to a lowered position to provide clearance for a downwardly sagging portion of the heated web relative to the plurality of female dies;
wherein positioning of the clamping grid above the heated web in combination with an upward movement of the plurality of female dies for clamping the heated web is configured to eliminate a contact between the heated web and the clamping grid which results in preventing damage to a surface finish of the heated web.

11. The horizontal thermoforming machine of claim 10, further comprising a pair of laterally spaced apart conveyor rails provided outboard of the clamping grid and defining a web delivery plane provided beneath a bottom surface of the clamping grid.

12. The horizontal thermoforming machine of claim 11, wherein the conveyor rails are horizontal, and further comprising an oven having the pair of horizontal conveyor rails configured to move a web of thermoformable material through the oven while heating the web.

13. The horizontal thermoforming machine of claim 11, wherein the female die on the lower platen has a top surface, when lowered to a bottom position, spaced from the web delivery plane greater than a height of the male die.

14. The horizontal thermoforming machine of claim 11, wherein a web sag gap provided between the web delivery plane and the plurality of female dies on the lower platen is greater than a height of the male die when the lower platen is at the bottom position.

15. The horizontal thermoforming machine of claim 11, wherein the clamping grid and the conveyor rails are supported by the frame in stationary locations, and the upper platen and the lower platen are moved vertically relative to the clamping grid.

16. A thermoforming machine, comprising:
a frame;
a movable upper platen supported by the frame for vertical reciprocation and carrying a plurality of male dies configured to interact with a heated web of thermoformable material supported in a horizontally extending configuration;

a stationary clamping grid carried by the frame above the horizontally extending heated web of thermoformable material and having a respective clearance aperture for each of the male dies;

a movable lower platen supported by the frame for vertical reciprocation beneath the clamping grid and carrying a plurality of female dies configured to interact with the horizontally extending heated web of thermoformable material;

a pair of laterally spaced apart and horizontally extending conveyor rails provided outboard of the clamping grid and defining a web delivery plane provided beneath a bottom surface of the clamping grid; and a web sag clearance zone provided between a bottom-most surface of the clamping grid and a top-most surface of all of the female dies having a depth at least 16 percent of a width of the top-most surface of all the female dies being spanned when the lower platen is vertically reciprocated to a lowered position to provide clearance for a downwardly sagging portion of the heated web relative to the plurality of female dies;

wherein positioning of the clamping grid above the heated web in combination with an upward movement of the plurality of female dies for clamping the heated web is configured to eliminate a contact between the heated web and the clamping grid which results in preventing damage to a surface finish of the heated web.

17. The thermoforming machine of claim 16, further comprising a horizontally extending oven encompassing an upstream portion of the conveyor rails configured to heat the web of thermoformable material.

18. The thermoforming machine of claim 16, wherein the web sag clearance zone is absent of any interfering structures between the bottom-most surface of the clamping grid and the top-most surface of the female die on the lower platen, when the lower platen is vertically reciprocated to a lowered position to provide clearance for a downwardly sagging portion of the heated web.

19. The thermoforming machine of claim 18, wherein a plurality of rows of male dies are provided on the upper platen and a plurality of rows of complementary female dies are provided on the lower platen.

20. The thermoforming machine of claim 19, wherein the plurality of female dies comprise a rectangular array of female dies.

* * * * *